United States Patent
Masselus et al.

(10) Patent No.: US 6,369,543 B1
(45) Date of Patent: Apr. 9, 2002

(54) METHOD FOR SYMMETRIZING ASYMMETRIC FAULTS

(75) Inventors: Jean-Emmanuel Masselus, Mont-sur-Marchienne; Alexis Colasse, Jambes; Jean-Marie Bodson, Wavre, all of (BE)

(73) Assignee: Alstom Belgium S.A. (BE)

( * ) Notice: Subject to any disclaimer, the term of this patent is extended or adjusted under 35 U.S.C. 154(b) by 0 days.

(21) Appl. No.: 09/601,372

(22) PCT Filed: Jan. 26, 1999

(86) PCT No.: PCT/BE99/00010

§ 371 Date: Nov. 24, 2000

§ 102(e) Date: Nov. 24, 2000

(87) PCT Pub. No.: WO99/39418

PCT Pub. Date: Aug. 5, 1999

(30) Foreign Application Priority Data

Jan. 28, 1998 (BE) ............................................. 98870017

(51) Int. Cl.$^7$ ................................................. H02P 1/46
(52) U.S. Cl. ..................... 318/700; 318/798; 318/803; 318/801; 318/800; 318/802; 318/808
(58) Field of Search ................................. 318/803, 801, 318/798, 800, 802, 805, 700; 363/98, 97; 361/18

(56) References Cited

U.S. PATENT DOCUMENTS

| | | | | |
|---|---|---|---|---|
| 4,706,177 A | * | 11/1987 | Josephonson | 363/24 |
| 5,280,228 A | * | 1/1994 | Kanouda et al. | 318/803 |
| 5,687,049 A | * | 11/1997 | Mangtani | 361/18 |
| 5,748,462 A | * | 5/1998 | Moro et al. | 363/97 |

FOREIGN PATENT DOCUMENTS

| | | |
|---|---|---|
| EP | 02119530 | 5/1990 |
| GB | 2 309 597 | 1/1997 |

* cited by examiner

*Primary Examiner*—Karen Masih
(74) *Attorney, Agent, or Firm*—Knobbe, Martens, Olson & Bear, LLP

(57) ABSTRACT

The present invention concerns a method for symmetrizing asymmetric faults occurring within a pull chain comprising a synchronous or asynchronous motor controlled by a two-level or multi-level inverter consisting of static switches using semiconductors such as IGBT or bipolar transistors. The invention comprises detecting whether the fault connects or may connect a motor phase with the top point or the bottom point of the inverter power supply, and short-circuiting only the half of the inverter affected by the fault on the basis of the detection.

7 Claims, 6 Drawing Sheets

METHOD FOR SYMMETRIZING ASYMMETRIC FAULTS

FIELD

The present invention aims to propose a method for symmetrizing asymmetric defects which may occur within a traction chain comprising a synchronous or asynchronous motor controlled by a voltage inverter.

BACKGROUND

Inverters, and more particularly voltage inverters, are intended to provide an AC voltage from a DC voltage.

A particularly important field of application is the variable-speed control of synchronous or asynchronous machines.

In this case, it is necessary for the load, which may be represented by each phase of a synchronous or asynchronous motor, to be provided with a three-phase voltage system which is as close as possible to a frequency-varying and amplitude-varying balanced sinusoidal three-phase system. The voltage inverter is a device which makes it possible to achieve this goal, and is made up of static switches using power components such as thyristors. Until very recently, among these power components, use was made essentially of semiconductors such as thyristors, GTOs, etc.

For some time, new types of static switches have been appearing which may be defined by the term "IGBT" (Insulated Gate Bipolar Transistor). These devices are controllable components, in the sense that one can at any moment prescribe the current required in the switch by adjusting the voltage on its control gate, whereas for the old generation of switches represented for example by GTOs or the like, it is possible only to decide the moment at which they turn on and the moment at which they turn off.

The present invention relates more particularly to inverters using the new generation of power components such as IGBTs or even bipolar transistors.

When a semiconductor is short-circuited (failure of a semiconductor) in a two-level inverter, the corresponding phase of the motor is connected permanently either to the top point of the inverter, or to the bottom point thereof, provided that the semiconductor situated on the same branch is off, otherwise the entire branch is short-circuited, this amounting to short-circuiting the input and the outputs of the inverter. At this moment, the action of blocking the remainder of the inverter by turning off all the unimpaired semiconductors will place the motor in an electrical configuration which may (depending on the instant of the defect) generate a transient excess torque at the motor shaft, causing the snapping of the mechanical transmission.

The solution to this problem is to cause a symmetric three-phase short-circuit at the terminals of the motor. To do this, several possibilities exist.

In the particular case of the short-circuiting of an asynchronous motor, it is known practice in particular from the document SU-1350783 to simultaneously short-circuit all the phases of a motor, so as to avoid an asymmetric defect, that is to say a defect linking a phase to the top point and to the bottom point of the power supply to the inverter. It is necessary to produce a symmetric three-phase short-circuit of the asynchronous motor so as not to load the mechanical transmission excessively by the excess torque generated by asymmetric short-circuits.

The simplest solution consists in turning on all the semiconductors of the inverter simultaneously, thus causing the short-circuiting of the input capacitor of the inverter. However, in this case, the semiconductors must be dimensioned so as to be able to withstand the short-circuit current of the inlet capacitor in addition to the short-circuit current of the motor. This is possible with GTO-based inverters, since the current in these transistors is limited by limiting inductances (di/dt). Unfortunately, in the case of IGBT-based inverters, the use of low-inductance busbars between the inlet capacitor of the inverter and the IGBTs results in the current not being limited by inductances as is the case for GTOs. Moreover, the IGBT itself limits its collector current by desaturating. These two reasons mean that this strategy is not easily transposable to IGBT-based inverters.

On the other hand, protection devices for IGBT-based two-level inverters powering a variable-speed motor exist in industry. Document GB-A-2309597 summarizes the state of the art in this area.

The devices in question use circuits for detecting desaturation of the IGBTs to detect a defect inside or at the output of the inverter and to disable the inverter.

The drawback of these devices is that they may generate an asymmetric defect on the asynchronous motor powered by the inverter protected by these same devices.

SUMMARY

The present invention aims to propose a method for protecting a synchronous or asynchronous traction chain, equipped with a voltage inverter, itself made up of static switches consisting of semiconductors, and which solves the problem of the capability of the said semiconductors to withstand current.

The present invention aims more particularly to be able to limit the torque of a synchronous or asynchronous motor powered by a two-level or multi-level voltage inverter generated during a defect located inside or outside the inverter powering the motor.

The present invention therefore aims to propose a strategy for the overall protection of the traction chain which makes it possible to symmetrize an asymmetric short-circuit at the output of a voltage inverter without damaging the latter.

The present invention relates to a method for symmetrizing an asymmetric defect which may occur within a traction chain comprising a synchronous or asynchronous motor controlled by a two-level or multi-level voltage inverter made up of static switches using semiconductors such as IGBTs or bipolar transistors, according to which one detects whether the defect connects or might connect a motor phase to the top point or to the bottom point of the power supply of the inverter, and in that one short-circuits only that half of the inverter exhibiting the defect on the basis of the result of the detection.

The present invention relates more precisely to a method of protection in which all the phases of the voltage inverter are connected permanently to the top point or to the bottom point of the inverter, thereby causing a symmetric three-phase short-circuit at the output of this inverter without causing any short-circuit on its input after detecting and locating a defect. This implies that all the phases of the motor are linked to the top point of the power supply of the inverter, if the defect is such that it links at least one motor phase to the top point of the power supply of the inverter, and that all the phases of the motor are linked to the bottom point of the power supply of the inverter, if the defect is such that it links at least one motor phase to the bottom point of the power supply of the inverter, this being achieved without causing any short-circuit on the input of the inverter.

According to the form of execution using a two-level inverter, the defect in a two-level inverter is located by using the principle of the detection of desaturation of the IGBT semiconductor.

According to the form of execution using an inverter with three or more levels, the defect in a three-level inverter is located by using the principles of the detection of desaturation and of the detection of active peak-limiting of the IGBT semiconductor.

DETAILED DESCRIPTION

Figure 1:
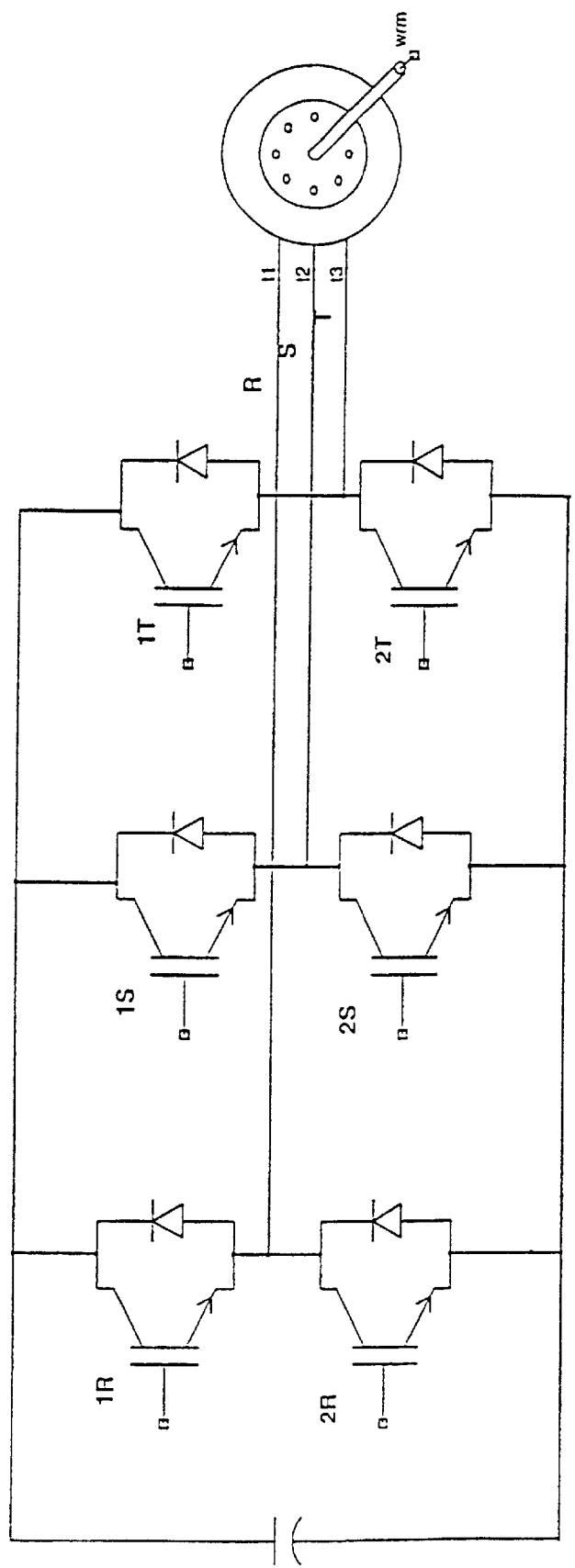
FIGS. 1, 2 and 3 represent the various steps of the method of the invention in the case of a two-level inverter connected to the three phases of an asynchronous motor.

FIG. 1 diagrammatically represents a two-level inverter connected to the three motor phases R, S and T of an asynchronous motor M.

This figure diagrammatically represents the three branches of a conventional two-level inverter which is used in the context of the present invention. Conventionally, each of the branches R, S, T of this inverter comprises two switches (1R, 2R), (1S, 2S), (1T, 2T), which alternately supply a load which is represented by a phase of the asynchronous motor M.

In this particular case, the load is of the self-inductive type, and it is necessary for the two switches of each branch to be arranged in parallel with a diode which is referred to as a "free wheel diode" (D1 or D2), which allows the load current to flow when the corresponding switch is open. The presence of this diode allows the inductive load current to decrease and thus makes it possible to avoid any destructive overvoltage when the corresponding switch is open.

Application to the Two-level Inverter

In the case where IGBT-type switches are used (unlike the case of switches of the GO type), reblocking is allowed upon the turning on of the semiconductor with regard to a short-circuit or when a short-circuit occurs even though the IGBT was turned on. Indeed, the IGBT intrinsically limits its collector current to a current of the order of 3 to 6 times its nominal current. This phenomenon is referred to as "desaturation".

Detection of the desaturation of the IGBT makes it possible to detect a short-circuit, and is carried out by comparing the value $V_{ce}$ (collector-emitter) at the terminals of the IGBT with a reference voltage generated internally within the starter which controls the IGBT. If the voltage $V_{ce}$ measured is greater than this reference voltage, the starter detects this and, if appropriate, can automatically reblock the IGBT which had been turned on and send a signal to the control electronics, indicating that a short-circuit has been detected.

The command electronics orders the turning off of the IGBTs situated on the same half-inverter and orders the turning on of the other IGBTs.

Let us assume for example that this control electronics receives the following information: switch 1R has been reblocked by the starter following detection of desaturation. This implies that the short-circuit links the phase R to the bottom-most point of the inverter. The action which the control electronics will take will be to turn on the switches 2R, 2S and 2T.

Figure 2:
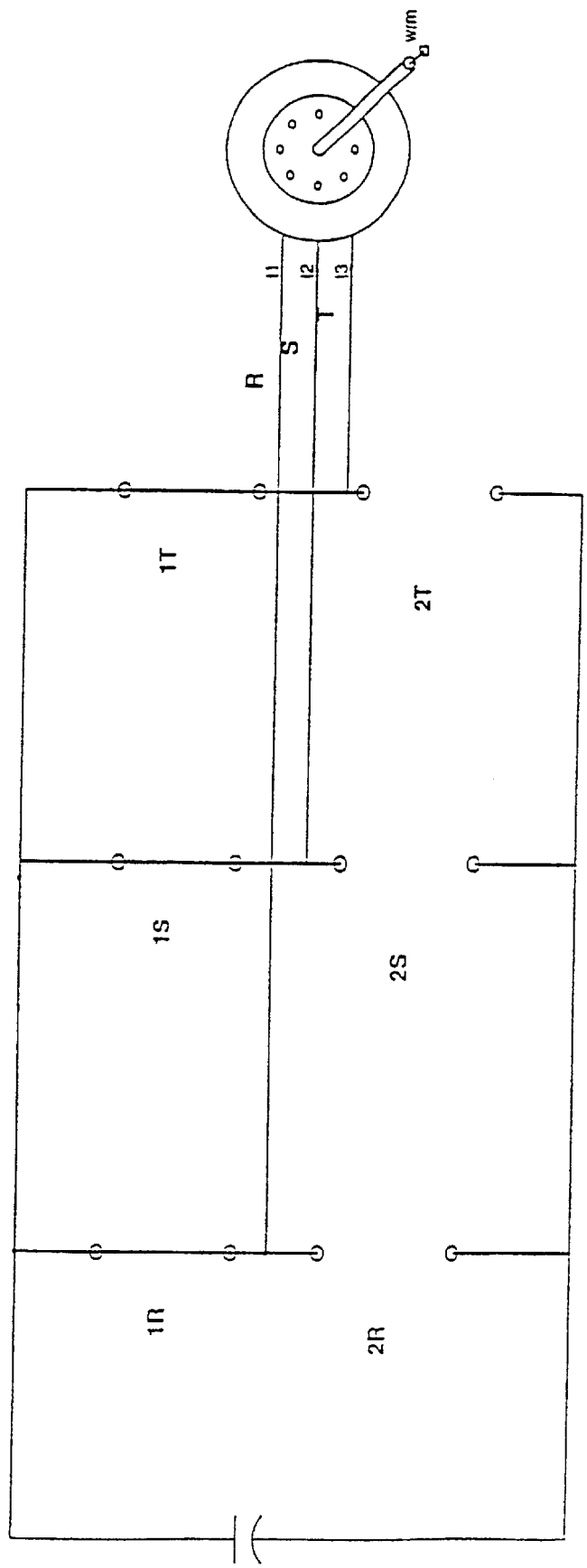
Figure 3:
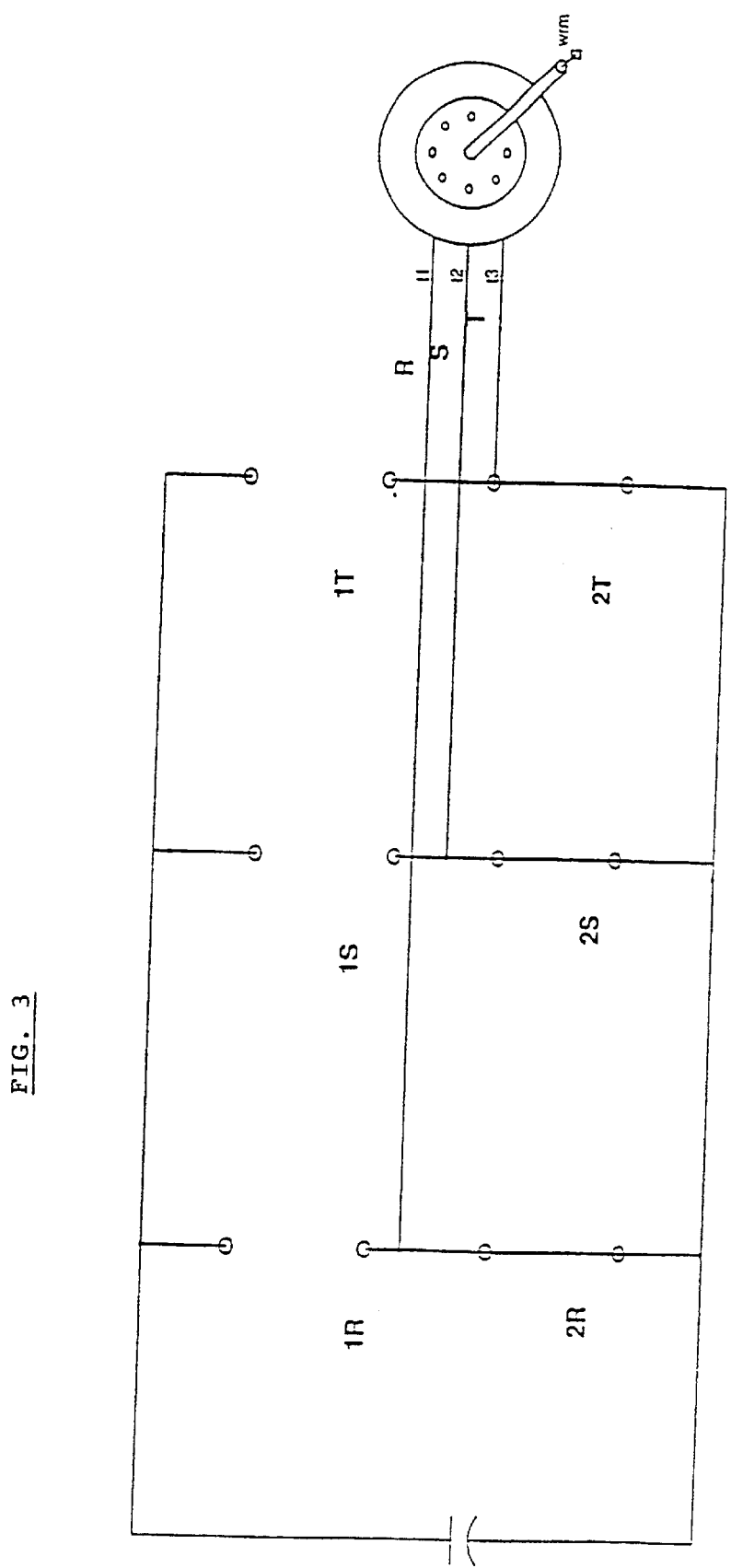

FIGS. 2 and 3 diagrammatically represent the short-circuiting of one of the two parts of the inverter.

More particularly, in FIG. 2, the upper part of the inverter is short-circuited. In this case, the control electronics sends opening commands to the switches 2R, 2S, and 2T, and turn-on commands to the switches 1R, 1S, and 1T. With the switches 1R, 1S, and 1T being connected together by their collectors, their simultaneously turning on causes a short-circuit between the three phases of the motor R, S, and T. The voltage of the input capacitor C is taken up by the switches 2R, 2S and 2T.

In FIG. 3, the lower part of the inverter is short-circuited. In this case, the control electronics sends opening commands to the switches 1R, 1S and 1T, and turn-on commands to the switches 2R, 2S and 2T. The switches 2R, 2S and 2T are connected together by their emitters, their simultaneous turning on causing a short-circuit between the three phases of the motor R, S and T. The voltage of the input capacitor C is taken up by the switches 1R, 1S and 1T.

Application to the Three-level Inverter

Figure 4:
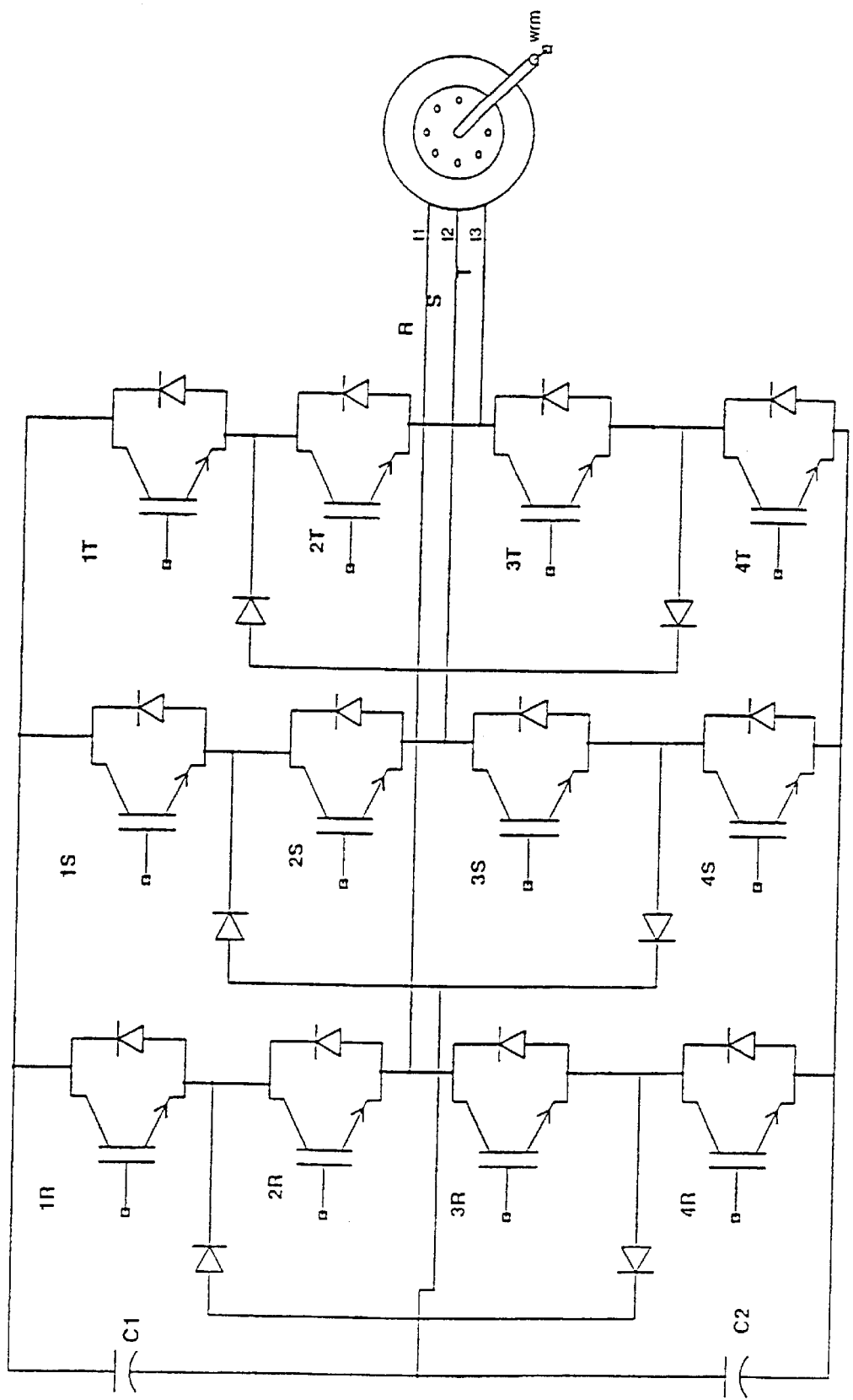
FIGS. 4, 5 and 6 represent the various steps of the method of the invention in the case of a three-level inverter connected to the three phases of an asynchronous motor.

FIG. 4 represents a three-level inverter connected to the three phases of an asynchronous motor. Each of the three branches R, S, T of the inverter is composed of four switches: R1 to R4, S1 to S4 and T1 to T4, which are turned on or turned off two by two so as to alternately power the load consisting of the phase of the asynchronous motor.

Once again, a free wheel diode D1 or D2 is disposed on each switch so as to allow the current to flow when the corresponding switches are open.

Figure 5:
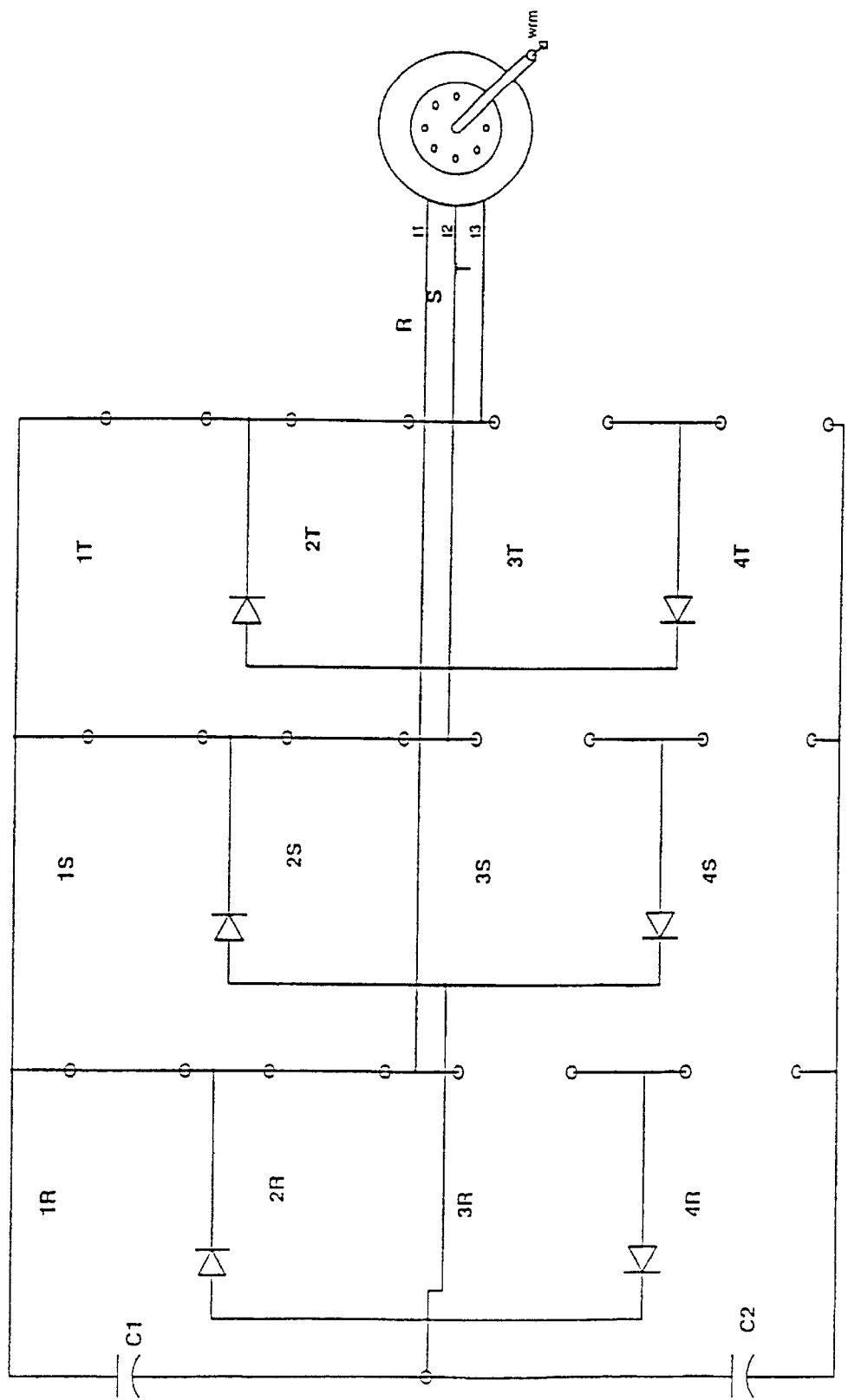
Figure 6:
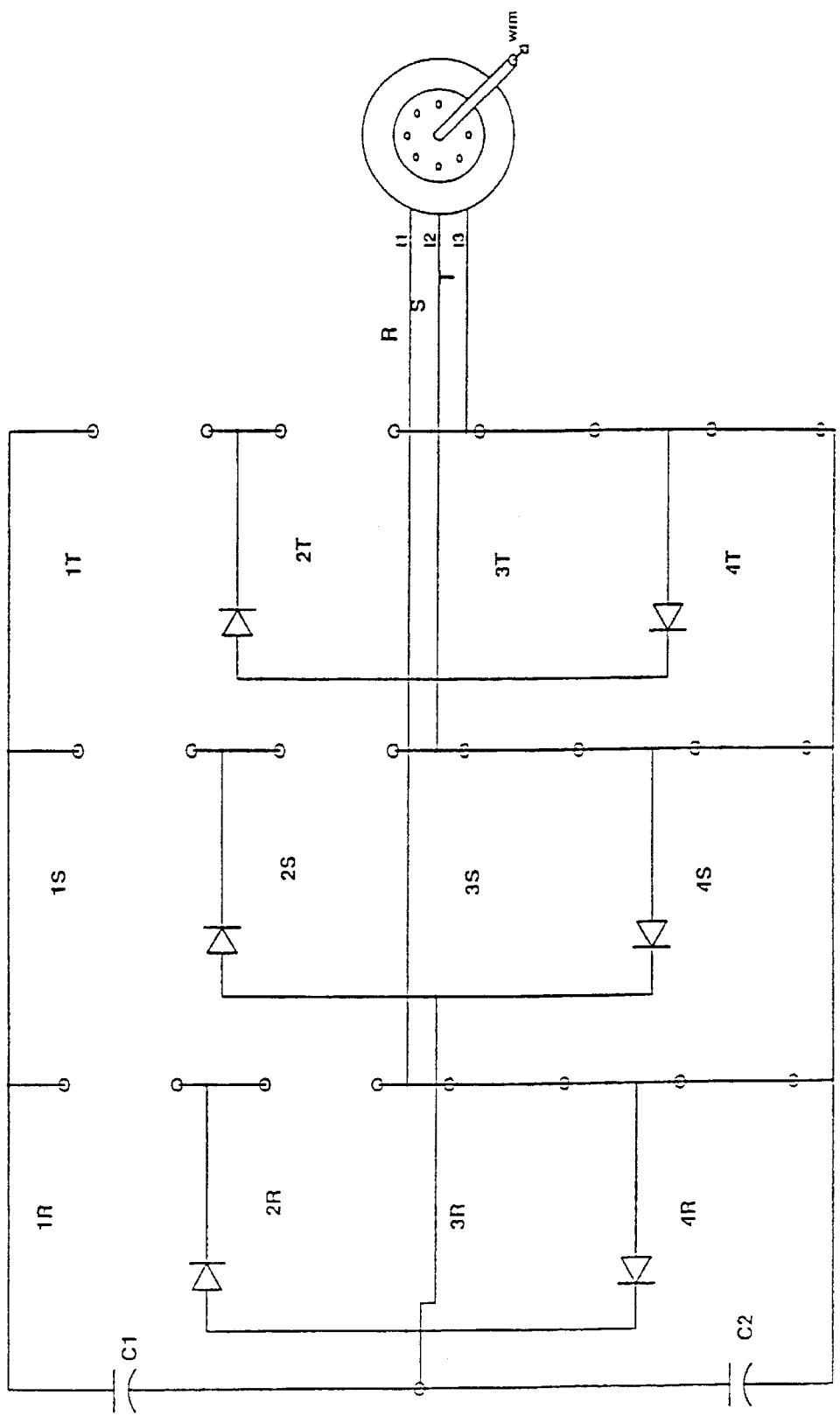

FIG. 5 represents the short-circuiting of the upper part of the inverter, whilst FIG. 6 represents the short-circuiting of the lower part of the inverter.

When a semiconductor is short-circuited in a three-level inverter, the problem is more complex than in the case of a two-level inverter.

The defect does not inevitably connect the corresponding phase to the top point or to the bottom point of the inverter. For example, if it is a semiconductor which is defective and if the short-circuited semiconductor is an interior semiconductor, there is the possibility of blocking the unimpaired semiconductors without causing any excess torque at the motor shaft.

On the other hand, in cases where the defect causes a phase to pass to the top point of the inverter or to its bottom point, the short-circuiting procedure is applicable.

The protection strategy is therefore as follows:

if desaturation is detected on an IGBT, the electronics causes the blocking of all the IGBTs of the inverter.

if an internal IGBT experiences an overvoltage, the corresponding starter protects it and returns an overvoltage information to the control electronics which orders the turning on of the IGBTs of the same half-inverter and orders the turning-off of the other IGBTs.

By way of example, let us envisage a defect causing a phase to pass to the top point of the inverter.

The IGBT 1R is on controlled by the control electronics, but it is nevertheless short-circuited. The IGBT is caused to be turned on and the load current is an outgoing current from the inverter. The IGBTs 3R and 4R are off.

The next step of the operation of the three-level inverter normally consists in turning off the IGBT 1R and in turning on the IGBT 3R.

What happens then?

1) The IGBT 1R will not turn off since it is defective.
2) The IGBT 3R will turn on and cause the short-circuiting of the loop C1, 1R, 2R, 3R, diode.
3) The IGBT 2R and/or the IGBT 3R will desaturate and the corresponding starter will block its IGBT while returning the information to the control electronics.

4) The control electronics will request the blocking of all the IGBTs of the inverter. All the IGBTs will block except for the IGBT 1R.
5) The collector of the IGBT 2R is connected to the top point of the inverter.
6) Since the current of the phase R is outgoing, it is impossible to block the IGBT R2 coldly without breaking it through overvoltage (since by blocking, it will cause the anti-parallel diodes 3R and 4R to conduct). But, the control electronics has issued the command to block all the IGBTs.
7) The solution adopted for avoiding breaking the IGBT R2 is to install protection against overvoltages by active peak-limiting on all the starters. In the event of an overvoltage, the active peak-limiting automatically limits the voltage $V_{ce}$ of the IGBTs to a predetermined value and informs the control electronics if the overvoltage is lasting too long. The control electronics then takes the decision to send a turn-on command to the half-inverter corresponding to the IGBT which has overvolted.

FIG. 5 represents the short-circuiting of the upper part of the inverter, whilst FIG. 6 represents the short-circuiting of the lower part of the inverter.

As represented in FIG. 5, since the switches 1R, 1S and 1T are connected together by their emitters, and their respective collectors are connected to the switches 2R, 2S and 2T, the action of turning on the switches 1R, 1S, 1T, 2R, 2S and 2T causes a short-circuit between the three motor phases R, S and T. The voltage of the input capacitors is taken up by the switches 3R, 3S, 3T, 4R, 4S and 4T.

In the case of the short-circuiting of the lower part, as represented in FIG. 6, since the switches 4R, 4S and 4T are connected together by their emitters, and their respective collectors are connected to the switches 3R, 3S and 3T, the action of turning on the switches 3R, 3S, 3T, 4R, 4S and 4T causes a short-circuit between the three motor phases R, S and T. The voltage of the input capacitor is taken up by the switches 1R, 1S, 1T, 2R, 2S and 2T.

What is claimed is:

1. In a traction chain comprising a motor driven by an inverter and associated power supply, a method of symmetrizing an asymmetric defect comprising detecting a defective component in said inverter which may result in the connection of a motor phase to a top point or a bottom point of said power supply;

in response to said detecting, short circuiting only that half of the inverter comprising said defective component.

2. The method of claim 1, wherein said short circuiting creates an inverter output short circuit without creating an inverter input short circuit.

3. The method of claim 1, wherein said short circuiting creates a short circuit between all phases of said motor.

4. The method of claim 1, wherein said detecting comprises detecting desaturation of an IGBT.

5. The method of claim 4, wherein said detecting comprises detecting active peak limiting of an IGBT.

6. The method of claim 1, wherein said inverter comprises a two-level inverter.

7. The method of claim 1, wherein said inverter comprises a three-level inverter.

* * * * *